US008040547B2

(12) United States Patent  
Ando

(10) Patent No.: US 8,040,547 B2
(45) Date of Patent: Oct. 18, 2011

(54) IMAGE FORMING APPARATUS, PRINTING SYSTEM, PRINTING METHOD AND PROGRAM

(75) Inventor: Motofumi Ando, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 528 days.

(21) Appl. No.: 12/258,631

(22) Filed: Oct. 27, 2008

(65) Prior Publication Data

US 2009/0109476 A1    Apr. 30, 2009

(30) Foreign Application Priority Data

Oct. 30, 2007    (JP) ................................. 2007-281815

(51) Int. Cl.
*G06F 15/00*    (2006.01)
*G06F 15/16*    (2006.01)
(52) U.S. Cl. ....................................... 358/1.15; 709/229
(58) Field of Classification Search ................. 358/1.15, 358/1.13, 1.14, 1.16, 1.18, 1.1, 1.9, 3.28, 358/400, 403, 402, 3.13, 474; 382/181, 305, 382/154, 282, 238, 217; 399/8, 12, 24; 709/229, 709/230, 206, 207, 219; 715/748, 202, 764; 705/1.1, 321
See application file for complete search history.

(56) References Cited

U.S. PATENT DOCUMENTS

2004/0101320 A1 *    5/2004    Haramoto ....................... 399/12

FOREIGN PATENT DOCUMENTS

JP        2006-099714        4/2006

* cited by examiner

*Primary Examiner* — Saeid Ebrahimi Dehkordy
(74) *Attorney, Agent, or Firm* — Fitzpatrick, Cella, Harper & Scinto

(57) ABSTRACT

To print, by discriminating a second user, print data unprintable by first user's printing authority, a control method for an image forming apparatus, printing print data specified by user discrimination information, comprises: reading discrimination information; obtaining printing authority information corresponding to first user discrimination information for discriminating a first user specified by discrimination information of the first user; judging whether input print data can be printed based on the printing authority information corresponding to the obtained first user discrimination information; determining, if judged that the input print data is unprintable based on the printing authority information corresponding to the first user discrimination information, printable print data based on printing authority information corresponding to second user discrimination information for discriminating a second user specified by discrimination information of the second user; and printing the printable print data.

19 Claims, 15 Drawing Sheets

FIG. 2

| CLASSIFICATION | CONTENTS | | EXAMPLES |
|---|---|---|---|
| DOCUMENT INFORMATION | AUTHOR ~1601 | | ando |
| | CREATION DATE ~1602 | | 20070910140136 |
| | DOCUMENT NAME ~1603 | | WRITTEN ESTIMATE |
| | PAPER SIZE ~1604 | | A4 |
| | NUMBER OF PAGES ~1605 | | 3 |
| PRINTING SETTING INFORMATION | COLOR INFORMATION (COLOR/MONOCHROME) ~1606 | | FULL COLOR |
| | DOUBLE-SIDED PRINTING INFORMATION (DOUBLE-SIDED/SINGLE-SIDED) ~1607 | | DOUBLE-SIDED |
| | Nup INFORMATION (1 PAGE/COPY, 2 PAGES/COPY, ...) ~1608 | | 1 PAGE/COPY |

FIG. 3A

| [CARD ID] | [USER NAME] | [HIERARCHICAL GROUP IDENTIFIER] | [APPROVAL AUTHORITY] | [APPROVAL AUTHORITY EFFECTIVE LAYER] | [COLOR PRINTING LIMITATION INFORMATION] | [SINGLE-SIDED PRINTING LIMITATION INFORMATION] | [Nup PRINTING LIMITATION INFORMATION] |
|---|---|---|---|---|---|---|---|
| a123456789 | takahashi | 1111110000 | 1 | 3 | Color | Permit | 1 |
| b123456789 | morii | 1111111000 | 1 | 2 | Color | Permit | 1 |
| c123456789 | daigo | 1111111200 | 1 | 2 | Color | Permit | 1 |
| d123456789 | hanada | 1111111100 | 1 | 0 | BiColor | Permit | 2 |
| e123456789 | hashimoto | 1111111200 | 1 | 1 | BiColor | Permit | 2 |
| f123456789 | ueno | 1111111210 | 0 | 0 | Bw | Deny | 4 |
| h123456789 | ando | 1111111110 | 0 | 0 | Bw | Deny | 4 |
| i123456789 | wakimoto | 1111112110 | 0 | 0 | Bw | Deny | 4 |

FIG. 3B

| CONTENTS | EXAMPLES |
|---|---|
| COLOR PRINTING LIMITATION INFORMATION (ColorLocalPrint) 506 | FULL COLOR (Color) BICHROME (BiColor) MONOCHROME (UniColor) BLACK AND WHITE (Bw) |
| SINGLE-SIDED PRINTING LIMITATION INFORMATION (Simplex) 507 | PERMIT (Permit) DENY (Deny) |
| Nup PRINTING LIMITATION INFORMATION (Nup) 508 | NO LIMITATION (1) 1 PAGE/COPY DENY (2) 1 TO 2 PAGES/COPY DENY (4) |

IMAGE FORMING APPARATUS, PRINTING SYSTEM, PRINTING METHOD AND PROGRAM

BACKGROUND OF THE INVENTION

1. Field of the Invention

The present invention relates to an image forming apparatus, a printing system, a printing method, and a program for achieving the printing method.

2. Description of the Related Art

In recent years, since security has come to be valued in a multifunctional machine which inputs and outputs information in an office environment, measures for security in the multifunctional machine are required as well as PCs (personal computers). To meet such a request, a mechanism of providing an authentication function in the multifunctional machine and thus permitting a user who has been authenticated to use the multifunctional machine has been provided. For example, Japanese Patent Application Laid-Open No. 2006-099714 discloses a technique of permitting only authenticated users to use a multifunctional machine, and of performing printing of print data of the permitted users by using the authenticated multifunctional machine.

Further, to improve security in the multifunctional machine, it is desired to limit the functions and the printing methods of the multifunctional machine with respect to each user.

However, in the technique disclosed in Japanese Patent Application Laid-Open No. 2006-099714, since it is merely judged whether or not the relevant user is the user who can use the multifunctional machine, it is impossible to limit the functions and the printing methods of the multifunctional machine. In addition, in a mechanism of preparing limitation information for each user and thus limiting use of a multifunctional machine based on the prepared limitation information, for example, it is impossible in case of printing a document to perform the printing if a printing setting permitted by user's own authorization is not established. For this reason, if it is necessary for a user to perform the printing in a printing setting not permitted, it is necessary to seek out another user who has been permitted to perform the printing in the relevant printing setting, transmit electronic data of the document to the sought user, and thus cause the sought user to perform the printing of the transmitted electronic data on behalf of the user who intends to perform the printing. Therefore, this comes to be a complicated operation.

In particular, since a ratio of temporary employees (or temporary workers) in a workplace increases nowadays, the level of business that the temporary employees have to perform is generally high. Under the circumstances, a case where the temporary employee creates documents such as a written proposal and the like and prints the created documents has increased. However, it is general according to company rules that authority for color printing is not given to temporary employees. For this reason, a case where the temporary employee transmits via an electronic mail or the like the electronic data of a document such as a written proposal or the like created in color to a permanent employee (or a regular worker) so that the permanent employee performs, on behalf of the temporary employee, printing of the created color document has increased. Consequently, it becomes difficult to perform works efficiently. Further, to give printing authority which exceeds printing authority of ordinary temporary employees to a specific temporary employee is difficult from the aspect of management of printing authority.

SUMMARY OF THE INVENTION

The present invention provides an image forming apparatus, a printing system, a printing method and a program for achieving the printing method, which all overcome the above-described problem.

For example, the present invention aims to cause to perform printing of print data, which cannot be printed by printing authority of a first user, by discriminating a second user.

Further features of the present invention will become apparent from the following description of the exemplary embodiments with reference to the attached drawings.

BRIEF DESCRIPTION OF THE DRAWINGS

The accompanying drawings, which are incorporated in and constitute a part of the specification, illustrate the exemplary embodiments of the present invention and, together with the description, serve to describe and explain the principle of the present invention.

FIG. 2 is a diagram illustrating an example of bibliographic information.

FIG. 3A is a diagram illustrating an example of definition files.

FIG. 3B is a diagram illustrating an example of settings of color printing limitation information, single-sided printing limitation information and Nup printing limitation information.

DESCRIPTION OF THE EMBODIMENTS

Hereinafter, the exemplary embodiments of the present invention will be described with reference to the attached drawings.

First Embodiment

Figure 1:
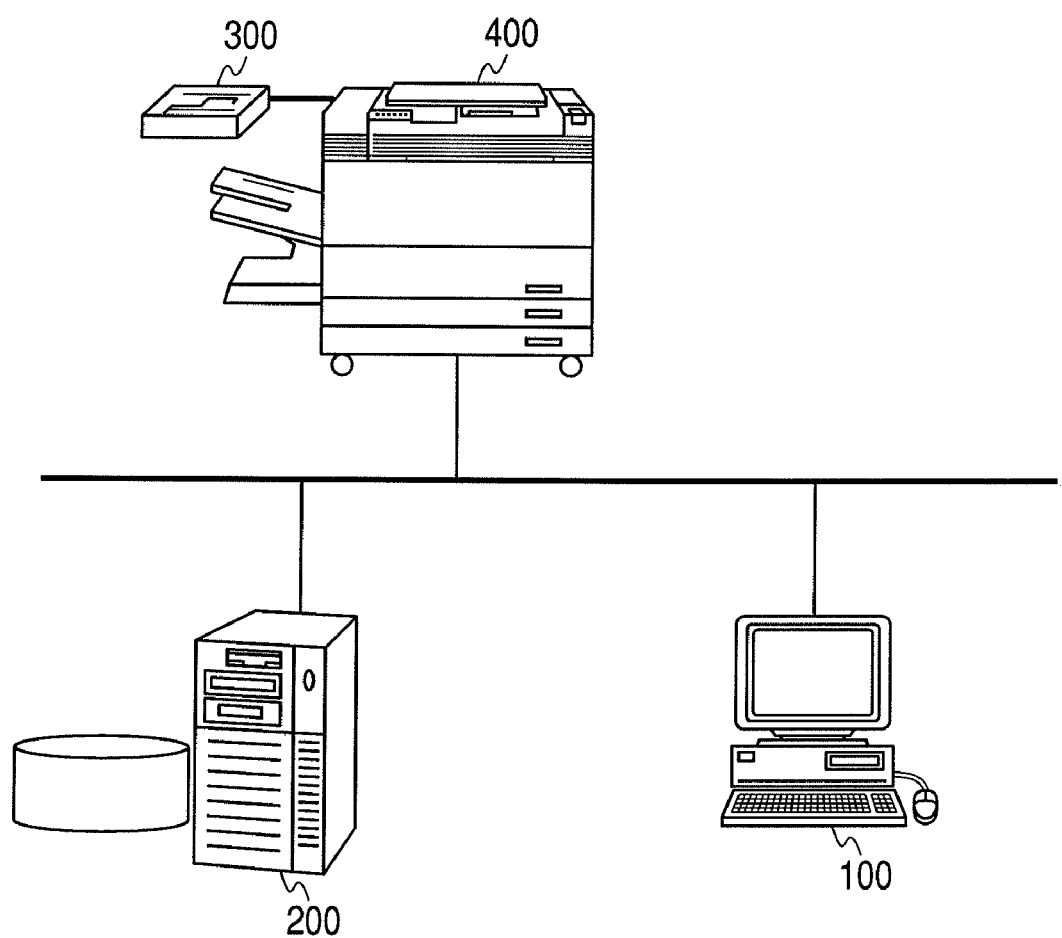
FIG. 1 is a diagram illustrating an example of the system configuration of a printing system according to the first embodiment.

FIG. 1 is a diagram illustrating an example of the system configuration of a printing system according to the first embodiment.

As illustrated in FIG. 1, in the printing system of the present invention, a client PC (personal computer) 100, an authentication server 200, and a multifunctional machine 400 having a card reader 300 are communicably connected to others via a network. Here, it should be noted that the multifunctional machine 400 is an example of an image forming apparatus according to the present invention.

A printer driver, which has been installed in the client PC 100, creates print data based on the data received from an application program, and transmits the created print data to the multifunctional machine 400 which acts as a computer concerning an image forming process.

Figure 5:
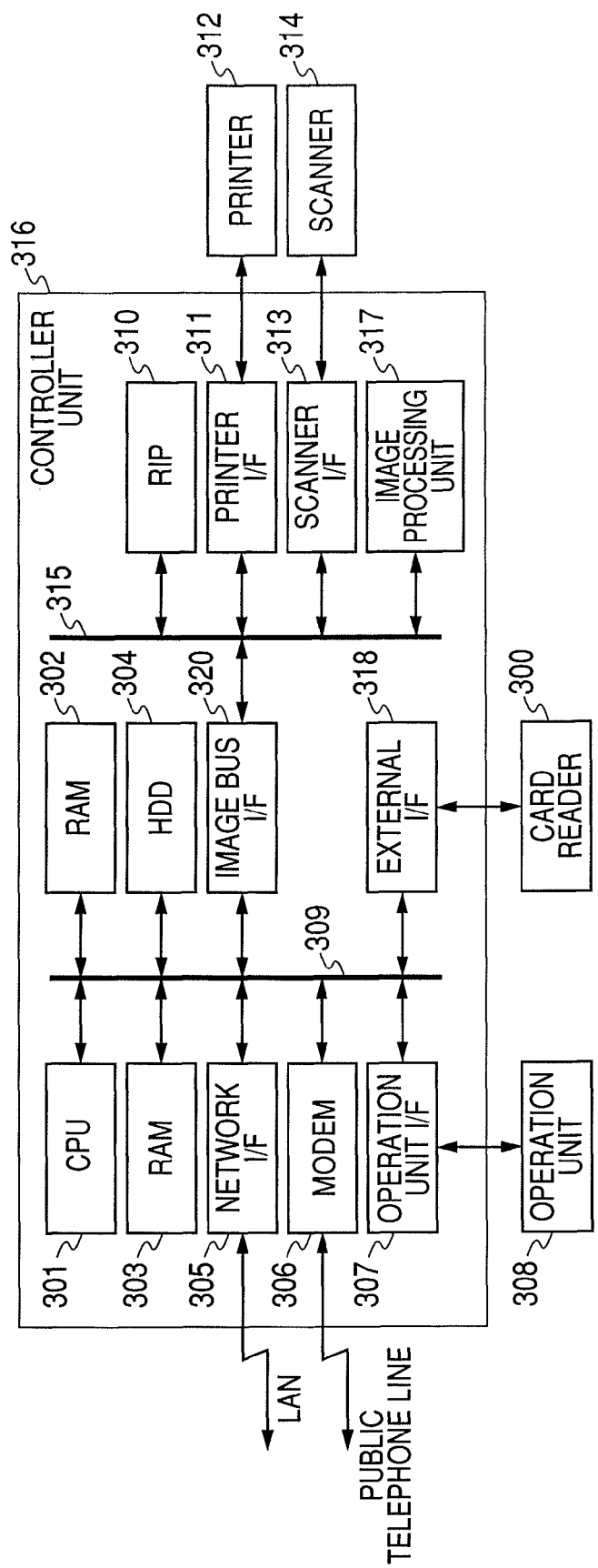
FIG. 5 is a block diagram illustrating an example of the hardware constitution of the controller unit of a multifunctional machine 400.

The multifunctional machine 400 receives the print data from the client PC 100, and stores the received print data in a later-described HDD (hard disk drive) 304 (FIG. 5). After receiving the print data, a printing module which operates in the multifunctional machine 400 obtains bibliographic information 1601, 1602, 1603, 1604, 1605, 1606, 1607 and 1608 respectively illustrated in FIG. 2 from the received print data, and stores the obtained information in a memory such as a later-described RAM (random access memory) 302 (FIG. 5) or the like. Here, FIG. 2 is the diagram illustrating an example of the bibliographic information. As illustrated in FIG. 2, the bibliographic information includes document information and printing setting information.

Incidentally, it should be noted that, in the bibliographic information, the information 1602 and 1603 are specifying information for specifying the print data and the information 1601 is user information for specifying a user.

Again, in FIG. 1, if the user logs in to the system, the printing module retrieves a creator of the bibliographic information (document information) 1601 based on the user name or the like of the user who logged in, and displays the corresponding document information and the like on a later-described operation unit 308 (FIG. 5). Further, the printing module performs printing and deletes the print data concerning the document information and the like according to user's operations on the operation unit 308.

The authentication server 200 holds ID cards 501 and definition files respectively holding user information 502, 503, 504, 505, 506, 507 and 508 associated with the corresponding ID cards 501. Here, the ID cards 501 and the user information 502 to 508 are illustrated in FIG. 3A. More specifically, the authentication server 200 retrieves the definition file according to user information (i.e., a card number, or user name/password) transmitted from the multifunctional machine 400, and, in a case where the corresponding user exists, returns the card ID 501 and the user information 502 to 508 to the multifunctional machine 400. Here, it should be noted that FIG. 3A is the diagram illustrating an example of the definition files, and FIG. 3B is a diagram illustrating an example of settings of color printing limitation information, single-sided printing limitation information and Nup printing limitation information.

Hereinafter, the hardware constitution of an information processing apparatus which is applicable to the client PC 100 and the authentication server 200 will be described with reference to FIG. 4.

Figure 4:
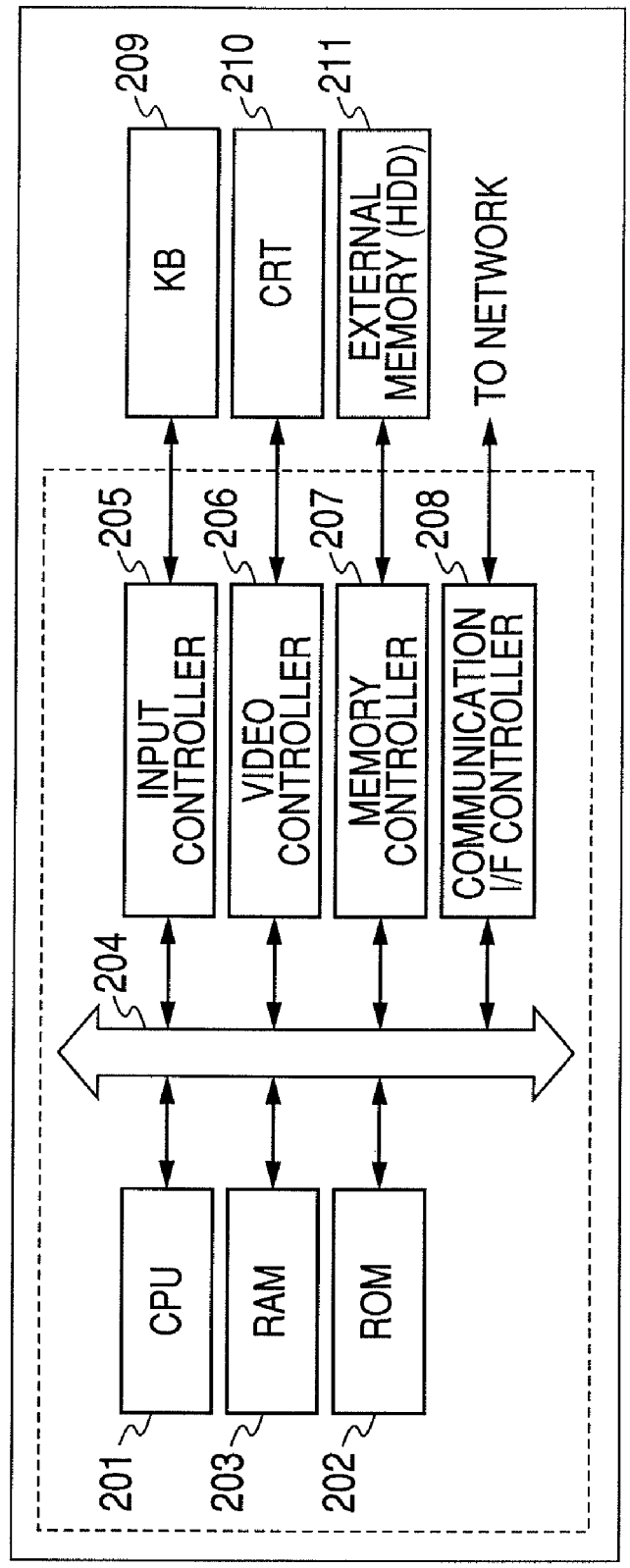
FIG. 4 is a block diagram illustrating an example of the hardware constitution of an information processing apparatus which is applicable to a client PC 100 and an authentication server 200.

FIG. 4 is the block diagram illustrating an example of the hardware constitution of the information processing apparatus which is applicable to the client PC 100 and the authentication server 200.

In FIG. 4, a CPU (central processing unit) 201 totally controls respective devices and controllers which are connected to a system bus 204. Further, operation programs such as a BIOS (Basic Input/Output System) and an OS (operating system), various programs concerning the functions of respective servers and PCs, and the like have been stored in a ROM (read only memory) 202 or an external memory or an HDD (hard disk drive) 211.

A RAM (random access memory) 203 functions as a main memory, a working area and the like for the CPU 201. In case of actually performing a process, the CPU 201 loads a necessary program or the like from the ROM 202 or the external memory 211 to the RAM 203, and achieves various operations (or functions) by performing the loaded program or the like.

An input controller 205 controls inputting from a KB (key board) 209, a pointing device such as a not-illustrated mouse or the like, and the like. A video controller 206 controls a displaying operation on a displaying device such as a CRT (cathode ray tube) 210 or the like. Incidentally, although FIG. 4 illustrates only the CRT 210, the displaying device is not limited to this. That is, other displaying devices such as a liquid crystal display and the like may also be used.

A memory controller 207 controls accessing to the HDD or the external memory 211 connected to a PCMCIA (Personal Computer Memory Card International Association) card slot via an adapter. Incidentally, it should be noted that a boot program, various applications, various font data, user files, editing files, various data and the like are stored in the external memory 211.

A communication I/F (interface) controller 208 performs a controlling process concerning connection and communication between the information processing apparatus and an external device connected via the network. Here, the client PC 100 and the authentication server 200 can perform communication or the like by using, for example, a TCP/IP (Transmission Control Protocol/Internet Protocol).

Incidentally, the CPU 201 enables displaying on the CRT 210 by performing an outline font extracting (rasterizing) process to, for example, a display information region in the RAM 203. Further, the CPU 201 enables user's instructions by a not-illustrated mouse cursor or the like on the CRT 210.

Here, various programs necessary to achieve the present embodiment have been stored in the external memory 211, the stored programs are loaded to the RAM 203 according to necessity, and the loaded programs are performed by the CPU 201. Incidentally, it is assumed that also definition files, various information tables and the like to be used to perform the programs have been stored in the external memory 211.

Subsequently, the hardware constitution of the controller unit for controlling the multifunctional machine 400 will be described with reference to FIG. 5.

FIG. 5 is the block diagram illustrating an example of the hardware constitution of the controller unit of the multifunctional machine 400.

In FIG. 5, a controller unit 316 is connected to a scanner 314 which functions as an image input device and to a printer 312 which functions as an image output device. Further, the controller unit 316 is connected to a LAN (local area network)

and to a public line such as a WAN (wide area network). Under the circumstances, the controller unit 316 functions to input and output various image data and device information.

In the controller unit 316, a CPU 301 is the processor which controls the whole of the system, the PAM 302 is the system network memory which is used for an operation of the CPU 301. Also, the RAM 302 acts as the program memory which is used to record or store programs and as the image memory which is used to temporarily record or store image data.

Incidentally, boot programs for the system and various control programs have been stored in a ROM 303. Further, various programs for controlling the system, various image data and the like have been stored in the HDD 304.

An operation unit I/F 307, which is the interface unit between the controller unit 316 and the operation unit (or a UI (user interface)) 308, outputs to the operation unit 308 the image data to be displayed on the operation unit 308. Further, the operation unit I/F 307 functions to transfer the information (for example, user information or the like) input by the user of the system from the operation unit 308 to the CPU 301. Incidentally, the operation unit 308 is equipped with a display unit which includes a touch panel. Therefore, if buttons displayed on touch panel of the display unit are depressed (or touched) by the finger of the user, the operation unit 308 issues various instructions corresponding to the depressed buttons.

A network I/F 305, which is connected to the network (LAN), inputs and outputs various data from and to the LAN. A modem 306, which is connected to the public line, inputs and outputs various data such as facsimile reception data, facsimile transmission data and the like from and to the public line.

An external I/F 318 is the interface unit which receives and accepts external inputs from a USB (Universal Serial Bus), an IEEE1394 (Institute of Electrical and Electronics Engineers 1394) bus, a printer port, an RS-232C (Recommended Standard 232 Version C) bus, and the like. In the present embodiment, the card reader 300, which is used to read an IC card necessary for an authentication process, is connected to the external I/F 318. Then, the CPU 301 controls the information reading from the IC card by the card reader 300 via the external I/F 318, and thus obtains the information read from the IC card. The above devices are arranged on a system bus 309.

An image bus I/F 320 is the bus bridge which connects the system bus 309 and an image bus 315 for transferring the image data at high speed. Also, the image bus I/F 320 converts the data structure of the transferred image data.

The image bus 315 is constituted by a PCI (Peripheral Component Interconnect) bus or the IEEE1394 bus, and the following devices are arranged on the image bus 315.

An RIP (raster image processor) 310 rasterizes vector data such as a PDL (page description language) code or the like into a bitmap image. A printer I/F 311 connects the printer 312 and the controller unit 316, and performs synchronous/asynchronous conversion of image data. Further, a scanner I/F 313 connects the scanner 314 and the controller unit 316, and performs synchronous/asynchronous conversion of image data.

An image processing unit 317 performs correction, conversion and editing of input image data, and performs printer correction, resolution conversion and the like to print output image data. In addition, the image processing unit 317 performs rotation of image data, performs JPEG (Joint Photographic Experts Group) compression and extraction processes to multivalued image data, and performs JBIG (Joint Bi-level Image expert Group), MMR (Modified MR (Modified Relative element address designate)), MH (Modified Huffman) compression and extraction processes to binary image data.

The scanner 314 illuminates an image on a paper being an original and scans the illuminated image by using a CCD line sensor, and thus converts the scanned image into an electrical signal as raster image data. The original (paper) is set on the tray of an original feeder. Then, if the user of an apparatus instructs to start image reading via the operation unit 308, the CPU 301 instructs the scanner 314 so that the original feeder performs the original image reading operation as feeding the original one by one.

The printer 312 converts the raster image data into an image on a paper. Here, it should be noted that, in case of actually forming the image on the paper, it is possible to use any of an electrophotographic method which form an image by using a photosensitive drum and/or a photosensitive belt, an inkjet method which directly prints an image on a paper by discharging inks from a micro nozzle array, and the like. Such a printing operation is started in response to an instruction transferred from the CPU 301. Incidentally, the printer 312 contains plural paper feeding stages so that a user can flexibly select different paper sizes and/or different paper directions, and thus plural paper cassettes respectively corresponding to these stages are provided.

The operation unit 308 includes an LCD (liquid crystal display) on which a touch panel sheet has been adhered to display the operation screen of the system. If the key displayed on the operation screen is depressed, the operation unit 308 transfers position information indicating the position of the displayed key the CPU 301 via the operation unit I/F 307. Further, the operation unit 308 includes various operation keys such as a start key, a stop key, an ID (identification) key, a reset key, and the like.

Here, the start key of the operation unit 308 is used to start the reading operation of the original image, and the like. Further, two LEDs (light emitting diodes) of green and red are provided at the center of the start key so that the green LED indicates that the start key is available and the red LED indicates that the start key is unavailable. Further, the stop key of the operation unit 308 is used to instruct a stop of the going operation, the ID key of the operation unit 308 is used to input a user ID of the user of the system, and the reset key is used to initialize the setting from the operation unit 308.

Under the control of the CPU 301, the card reader 300 reads the information stored in the IC card, and then notifies the CPU 301 of the read information via the external I/F 318.

By the above constitution, the multifunctional machine 400 can transmit the image data read from the scanner 314 to the LAN 700, and can print-output the print data received from the LAN 700 by using the printer 312.

Further, the multifunctional machine 400 can perform facsimile transmission of the image data read from the scanner 314 to the public line by using the modem 306, and can output the image data facsimile-received from the public line by using the printer 312.

Figure 6:
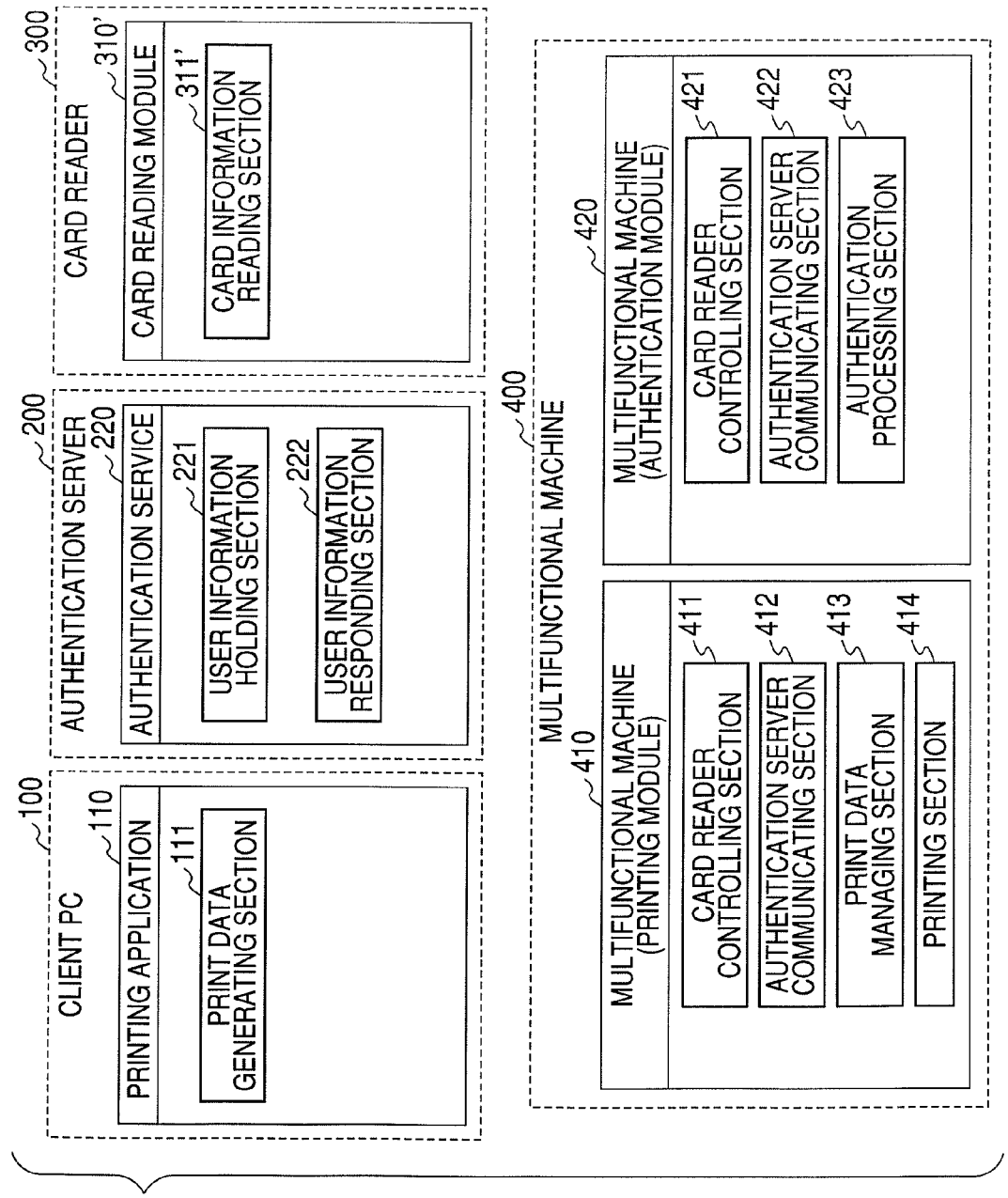
FIG. 6 is a diagram illustrating an example of the functions in the respective apparatuses (devices).

In the following, the functions in the respective apparatuses (devices) will be described with reference to FIG. 6. Here, FIG. 6 is the diagram illustrating an example of the functions in the respective apparatuses (devices).

The client PC 100, which can communicate with the multifunctional machine 400 via the network, is the information processing apparatus which can output the print data to be stored in the multifunctional machine 400. A printing application 110 in the client PC 100 includes a print data generating section 111 which has a generating function and a transmitting function. Here, the generating function is to generate the print data that printing setting has been added by the printer driver to the data generated by an application program, and the transmitting function is to transmit the generated print data to the multifunctional machine 400 by the printer driver.

The multifunctional machine 400, which can communicate with the client PC 100 via the network, has a function (a print data managing section 413) for storing the print data received from the print data generating section 111 of the client PC 100 in the HDD 304 of the multifunctional machine 400. Incidentally, although the core module in the multifunctional machine 400 actually receives the print data from the print data generating section 111, it will be assumed and described in the present embodiment that the print data managing section 413 temporarily or supposedly receives the print data.

The print data managing section 413, which received the print data from the print data generating section 111, has a bibliographic information extracting function for obtaining the bibliographic information 1601 to 1608 in the print data illustrated in FIG. 2 and a bibliographic information holding function for holding the extracted bibliographic information on a memory.

The card reader 300 can communicate with the multifunctional machine 400 via USB connection or the like. Further, a card reading module 310' in the card reader 300 includes a card information reading section 311'. Here, the card information reading section 311' has a reading function for detecting a card put on and then reading card information of the relevant card and a transmitting function for transmitting a card ID included in the read card information.

The card ID is transmitted to either a printing module 410 or an authentication module 420, which operates in the multifunctional machine 400. More specifically, the card reading module 310' of the card reader 300 transmits the card ID to the card reader controlling section of the module which controls the card reader 300.

A card reader controlling section 421 in the authentication module 420 has a controlling function for controlling communication with the card reader 300 connected via the USB or the like.

More specifically, the card reader controlling section 421 has a communication managing function and a card ID receiving function. Here, the communication managing function is to start and disconnect the communication between the multifunctional machine 400 and the card reader 300, and the card ID receiving function is to receive the card ID transmitted from the card reader 300 and transfer the received card ID to an authentication server communicating section 422. Further, the card reader controlling section 421 has a notifying function which is to notify, in case of transferring the control of the card reader 300 to another module, the relevant module (another module) of a controlling state of the card reader 300.

The authentication server communicating section 422 can communicate with an authentication service 220 in the authentication server 200 via the network. Further, the authentication server communicating section 422 has a card ID receiving function which is to receive the card ID notified from the card reader controlling section 421. Furthermore, the authentication server communicating section 422 has an authentication request generating function which is to generate an authentication request packet including as an authentication request the card ID and an authentication request flag to the authentication service 220 in order to obtain the user information associated with the card ID. Furthermore, the authentication server communicating section 422 has an authentication request transmitting function which is to transmit the generated authentication packet to the authentication server 200, and a receiving function which is to receive a response packet corresponding to the transmitted authentication request. Incidentally, if the authentication request is received, a user information responding section 222 in the authentication server 200 retrieves the user information illustrated in FIG. 3A on the basis of the card ID included in the authentication request, generates the response packet including the user information 502 to 508 corresponding to the card ID, and transmits the generated response packet to the authentication request source.

The authentication service 220, which operates in the authentication server 200, can communicate with the multifunctional machine 400 via the network.

The user information responding section 222 has a receiving function which is to receive the authentication packet transmitted from an authentication server communicating section 412 or the authentication server communicating section 422 via the network. Further, the user information responding section 222 has a retrieving function which is to first obtain the card ID from the received authentication packet, and then retrieve the user information, associated with the obtained card ID, from a list of the user information of FIG. 3A extracted by a user information holding section 221 on the memory. Furthermore, the user information responding section 222 has a responding function which is to generate a response packet including the user information and a response flag so as to return the user information 502 to 508 obtained as a result of the retrieval, and to return the generated response packet to the authentication server communicating section 412 or the authentication server communicating section 422.

The user information responding section 222 (retrieving function) retrieves, by using the card ID 501 as a key, the user name 502, the hierarchical group identifier 503, the approval authority 504, the approval authority effective layer 505, the color printing limitation information 506 being the information indicating a user's printing limitation, the single-sided printing limitation information 507, and the Nup printing limitation information 508, from the table illustrated in FIG. 3A.

If the user (user name) associated with the card ID obtained from the authentication packet exists in the user information, the user information responding section 222 (responding function) generates a response packet including the user information 502 to 508 of the corresponding user and a response flag indicating that the authentication succeeded, and transmits the generated response packet. On the other hand, if the user (user name) associated with the card ID obtained from the authentication packet does not exist in the user information, the user information responding section 222 (responding function) generates a response packet including only a response flag indicating that the authentication failed, and transmits the generated response packet.

If the table illustrated in FIG. 3A is updated externally, the user information holding section 221 considers a single line in the table as information of a single user (i.e., single user information), reads the table one line by one line, and holds on the memory the read single line as the single user information.

Further, the user information holding section 221 has only a holding function which is to hold the user information (including the card ID) on the memory. Then, the user information responding section 222 refers to the user information held by the user information holding section 221.

An authentication processing section 423 has a displaying function which is to obtain the response flag in the response packet from the authentication server 200 obtained by the authentication server communicating section 422, and to display, if the authentication failed, a message that the authentication failed to the user. Further, the authentication processing section 423 has a generating function which is to obtain, if the authentication succeeded, the user information (501 to 508 in FIG. 3) in the response packet, and to generate login information including the user information 501 to 508. Furthermore, the authentication processing section 423 has a notifying function which is to notify the printing module 410 of the login information so as to notify that the user logged in.

A printing section 414 has a printing performing function which is to actually perform printing of the print data. Here, only an operation at the time of authentication is described, and the printing performing function itself will be described later.

The printing section 414 has an obtaining function which is to obtain the user information 501 to 508 illustrated in FIGS. 3A and 3B from the login information notified by the authentication processing section 423 of the authentication module 420. Further, the printing section 414 has a retrieving function which is to obtain the user name 502 from the obtained user information, retrieve only the document of the corresponding user from the print data managing section 413, and hold the retrieved document on a memory. Furthermore, the printing section 414 has a displaying function which is to display as a list the document information obtained as a result of the retrieving illustrated in FIG. 2. When the list is displayed, the printing section 414 (displaying function) compares the information 506 to 508 concerning the printing limitation in the user information of FIGS. 3A and 3B obtained by the authentication server communicating section 422 with the printing setting information in the bibliographic information of FIG. 2 obtained by the print data managing section 413. Then, the printing section 414 (displaying function) displays in gray, as a printing limitation document, the document to which printing setting limited based on the printing limitation in the user information has been set (see later-described FIG. 13). That is, the printing section 414 (displaying function) discriminably displays the document information of the print data printable by printing authority of the user who logged in and the document information of the print data unprintable by the printing authority of the user who logged in.

More specifically, the printing section 414 (displaying function) compares the color printing limitation information 506 in FIG. 3B with the color information 1606 in FIG. 2, compares the single-sided printing limitation information 507 in FIG. 3B with the double-sided printing information 1607 in FIG. 2, and compares the Nup printing limitation information 508 in FIG. 3B with the Nup information 1608 in FIG. 2. Then, if the printing setting of the printing setting information of the bibliographic information is not permitted by the printing limitation information of the user information, the printing section 414 (displaying function) determines (or judges) the document as a limitation document. Further, the printing section 414 (displaying function) adds a flag indicating the limitation document to the document information of the document which has been determined (or judged) as the limitation document.

Further, the printing section 414 has an initial printing function and an approval printing function.

The printing section 414 (initial printing function) judges whether or not the flag indicating the limitation document is included in each document information in the document information displayed as the list.

Figures 7, 8:
FIG. 7 is a diagram illustrating an example of an authority lack dialog box.
FIG. 8 is a diagram illustrating an example of an approval authority lack error dialog box.

Then, if it is judged that the flag indicating the limitation document is not included in the document information, the printing section 414 (initial printing function) performs printing to the document data corresponding to the relevant document information. On the other hand, if it is judged that the flag indicating the limitation document is included in the document information, the printing section 414 (initial printing function) displays to the user a message dialog box (authority lack dialog box) indicating that the authority for performing the printing based on the printing setting of the relevant document lacks. As illustrated in FIG. 7, the printing section 414 (initial printing function) displays, in the form of the authority lack dialog box, the message (document text) for requesting to input the user information of the approved user and the list of the document information of the print data judged to be unprintable by the printing authority of the user who logged in. In any case, FIG. 7 is the diagram illustrating an example of the authority lack dialog box.

The printing section 414 (approval printing function) judges whether or not there is the printing authority for the printing setting of the document which was judged to be unprintable due to no printing authority in initial printing or previous approval printing. At this time, the printing section 414 (approval printing function) confirms based on the approval authority 504 of the user information whether or not the approved user has the approval authority. Then, if it is judged that the approved user has the approval authority, the printing section 414 (approval printing function) compares the hierarchical group identifier 503 of the user who performs the printing with the hierarchical group identifier 503 of the user who is approved (approved user). Consequently, if a difference between these hierarchies is within the approval authority effective layer indicated by the approval authority effective layer 505, the printing section 414 (approval printing function) judges that the approved user has the effective approval authority. Here, if it is judged that the approved user does not have the effective approval authority, the printing section 414 (approval printing function) displays an approval authority lack error dialog box as illustrated in FIG. 8 on the operation unit 308. In any case, FIG. 8 is the diagram illustrating an example of the approval authority lack error dialog box.

On the other hand, if it is judged that the approved user has the effective approval authority, the printing section 414 (approval printing function) judges whether or not the printing is possible, by comparing the information such as the color printing limitation information 506, the single-sided printing limitation information 507, the Nup printing limitation information 508 and the like of the approved user with the printing setting information of the document displayed in the approval authority lack error dialog box. Then, if it is judged that the printing is possible, the printing section 414 (approval printing function) performs the printing (approval printing). On the other hand, if it is judged that the printing is not possible, the printing section 414 (approval printing function) displays the approval authority lack error dialog box.

If all the documents are printed or if the stop button on the authority lack dialog box illustrated in FIG. 7 is depressed, the printing section 414 (approval printing function) ends the process. If the unprintable document (that is, the document which is unprintable due to no authority) exists, the printing section 414 (approval printing function) displays the approval authority lack error dialog box illustrated in FIG. 8 to repeat the approval printing process.

Figure 9:
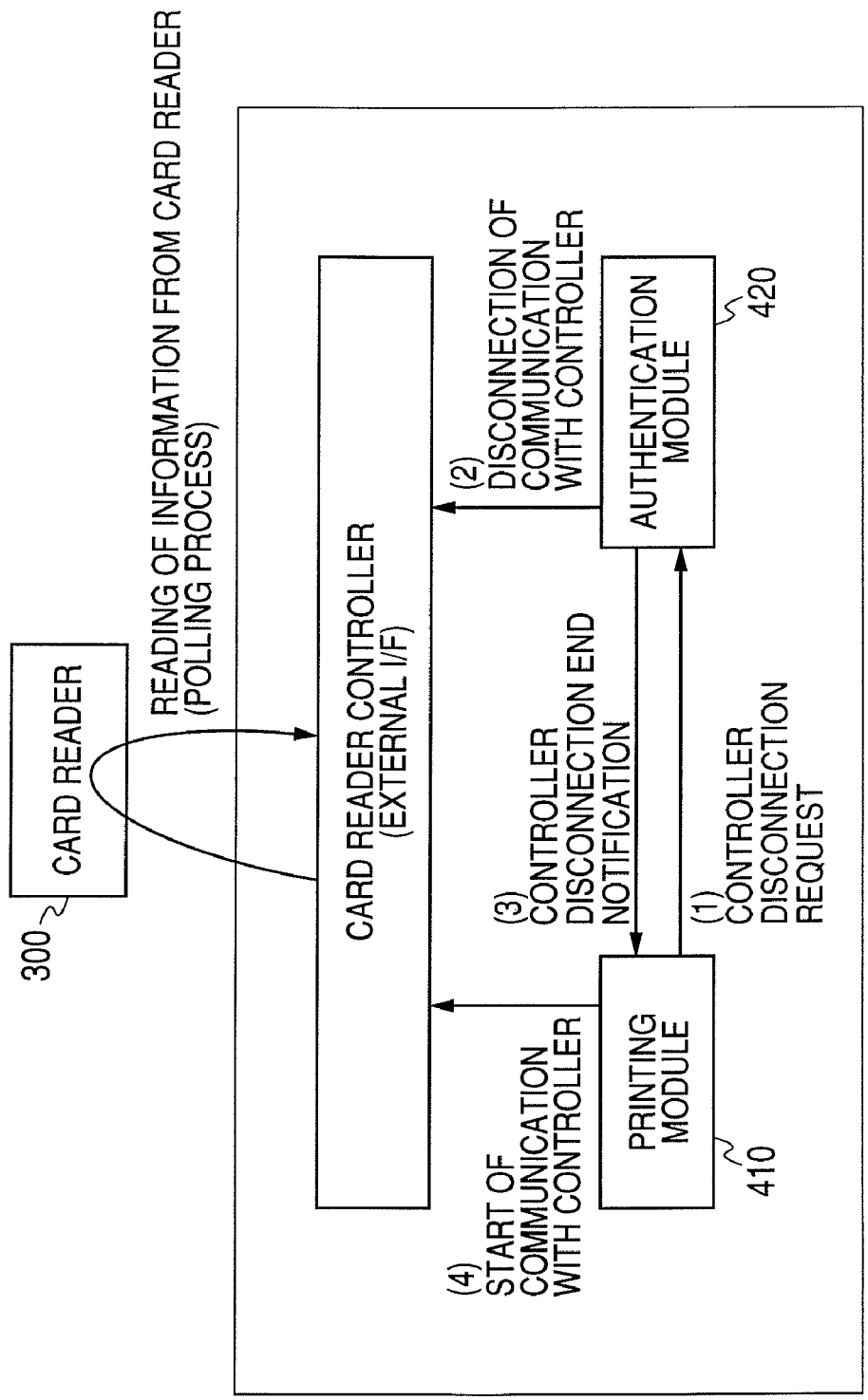
FIG. 9 is a diagram (part 1) illustrating an example of controlling for communication with a card reader 300.

A card reader controlling section 411 in the printing module 410 has a controlling function for controlling communication with the card reader connected via the USB or the like. More specifically, if the approval authority lack error dialog box illustrated in FIG. 8 is displayed by the printing section 414, the card reader controlling section 411 starts the communication with the card reader. In case of starting the communication, as illustrated in FIG. 9, the card reader controlling section 411 initially issues a card reader disconnection request (controller disconnection request) to the card reader controlling section 421 of the authentication module 420 as to disconnect the communication with the card reader controller. If the authentication module 420 succeeds in disconnecting the communication with the card reader 300, the card reader controlling section 411 in the printing module 410 starts the communication with the card reader controller. In any case, FIG. 9 is the diagram (part 1) illustrating an example of controlling for the communication with the card reader 300.

If a card is read by the card reader 300 while the communication between the card reader controlling section 411 and the card reader 300 is being performed, the card reader controlling section 411 receives the card ID from the card reader 300, and gives the received card ID to the authentication server communicating section 412.

Figure 10:
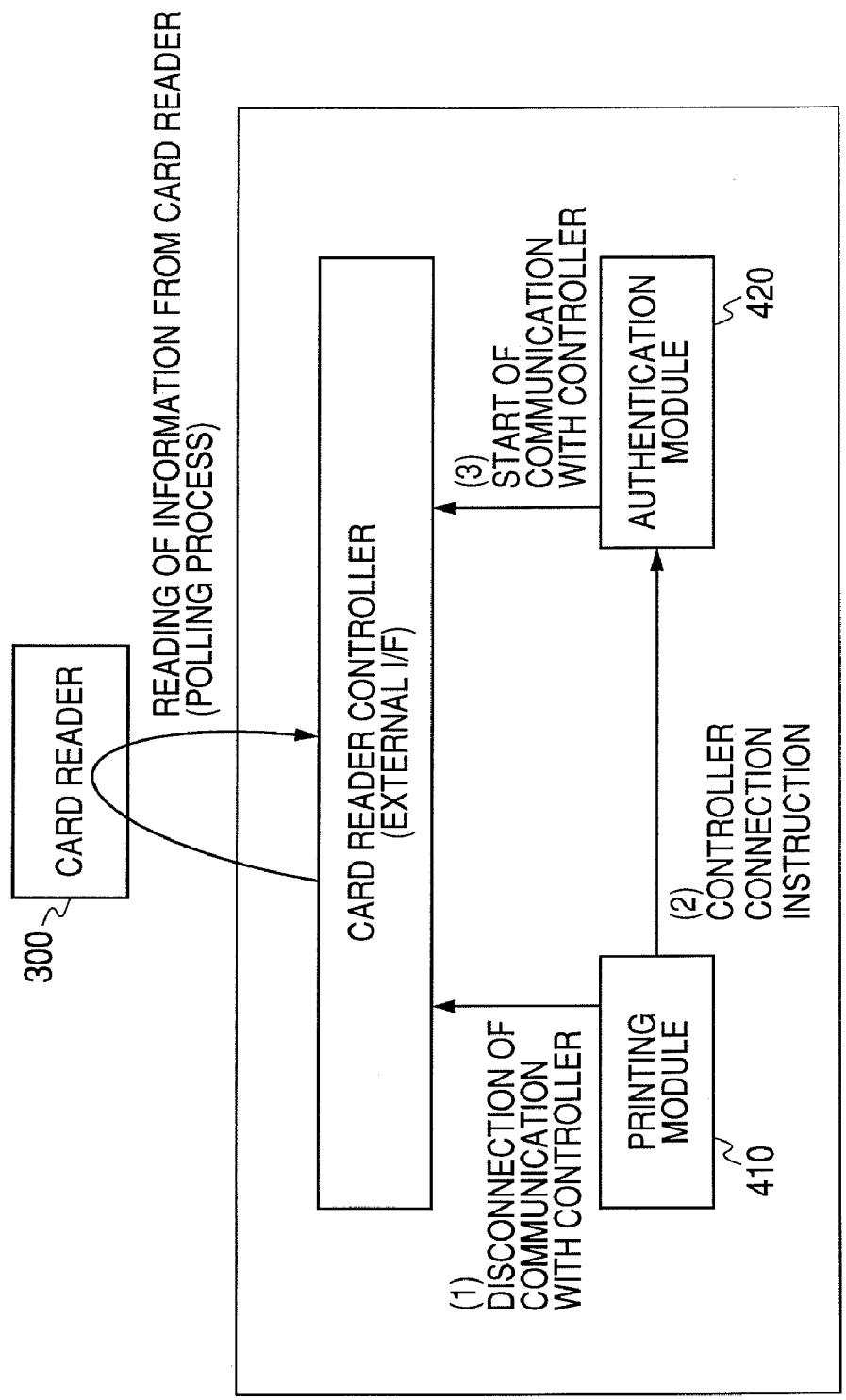
FIG. 10 is a diagram (part 2) illustrating an example of controlling for the communication with the card reader 300.

If the printing of all the documents is ended by the printing section 414, or if the printing is stopped via the approval authority lack error dialog box illustrated in FIG. 8, the card reader controlling section 411 disconnects the communication with the card reader 300 (or card reader controller) as illustrated in FIG. 10. Then, the card reader controlling section 411 issues a notification (controller connection instruction) to urge the card reader controlling section 421 of the authentication module 420 to start the communication with the card reader 300 (or card reader controller). Consequently, the card reader controlling section 421 of the authentication module 420 starts the communication with the card reader 300 (or card reader controller). Incidentally, FIG. 10 is the diagram (part 2) illustrating an example of controlling for the communication with the card reader 300.

The card reader controlling section 421 of the authentication module 420 has a receiving function which is to receive the notification sent from the card reader controlling section 411 of the printing module 410, and a controlling function which is to start/disconnect the communication with the card reader.

If the controller disconnection instruction is received from the card reader controlling section 411 of the printing module 410, the card reader controlling section 421 disconnects the communication with the card reader 300 (or card reader controller) and responds to the instruction by a disconnection end notification.

Moreover, if a controller connection request (controller connection instruction) is received from the card reader controlling section 411 of the printing module 410, the card reader controlling section 421 starts the communication with the card reader 300 (or card reader controller).

Figure 11:
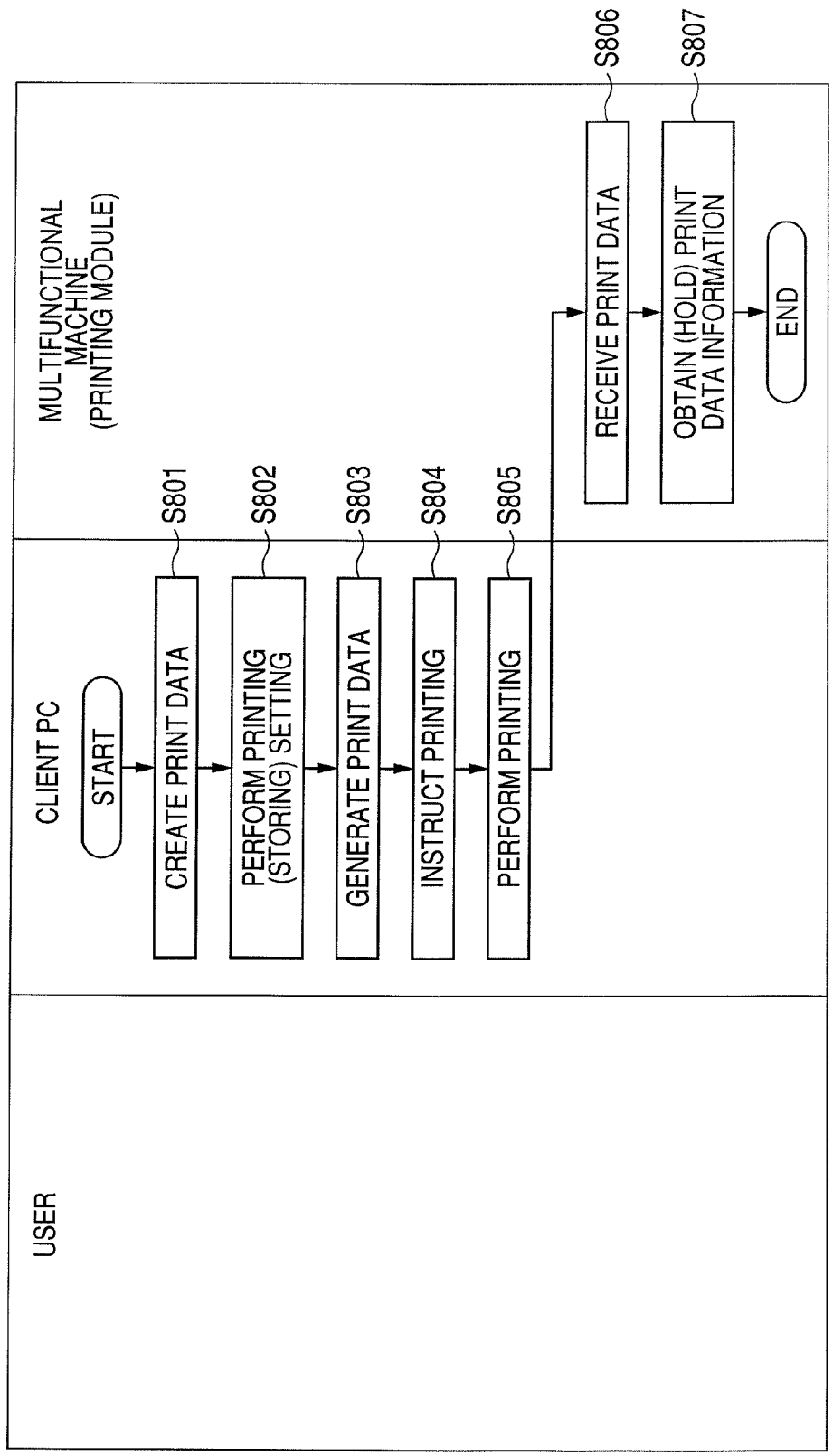
FIG. 11 is a flow chart illustrating an example of a print data storing process.

FIG. 11 is a flow chart illustrating an example of a print data storing process.

In a step S801, the print data generating section 111 of the client PC 100 receives and accepts application data which was created by the user and is to be printed.

In a step S802, the print data generating section 111 receives and accepts the printing setting of the printer driver in case of printing the application data.

In a step S803, the print data generating section 111 generates the print data which is obtained by applying the printing setting to the application data by the printer driver.

In a step S804, the print data generating section 111 receives and accepts a printing instruction from the user.

In a step S805, the print data generating section 111 transmits the print data generated in the step S803 to the printing module by using the printer driver. Incidentally, although the core module in the multifunctional machine practically receives the print data transmitted from the print data generating section 111, it is described in a step S806 that the print data managing section 413 supposedly receives the print data.

In the step S806, the print data managing section 413 receives the print data transmitted from the print data generating section 111 in the step S805, and once stores the received print data in the HDD 304 of the multifunctional machine 400. Incidentally, it is assumed that the HDD 304 is partitioned by plural logical storage areas (boxes), and the received print data is stored in the boxes.

In a step S807, the print data managing section 413 obtains the bibliographic information which consists of the document information and the printing setting information illustrated in FIG. 2 from the print data received and stored in the step S806, and holds the obtained bibliographic information on the RAM 302 which is an example of the storage unit. Incidentally, the print data managing section 413 may hold, on the RAM 302, the box number corresponding to the box in which the print data has been stored, together with the bibliographic information.

Figure 12:
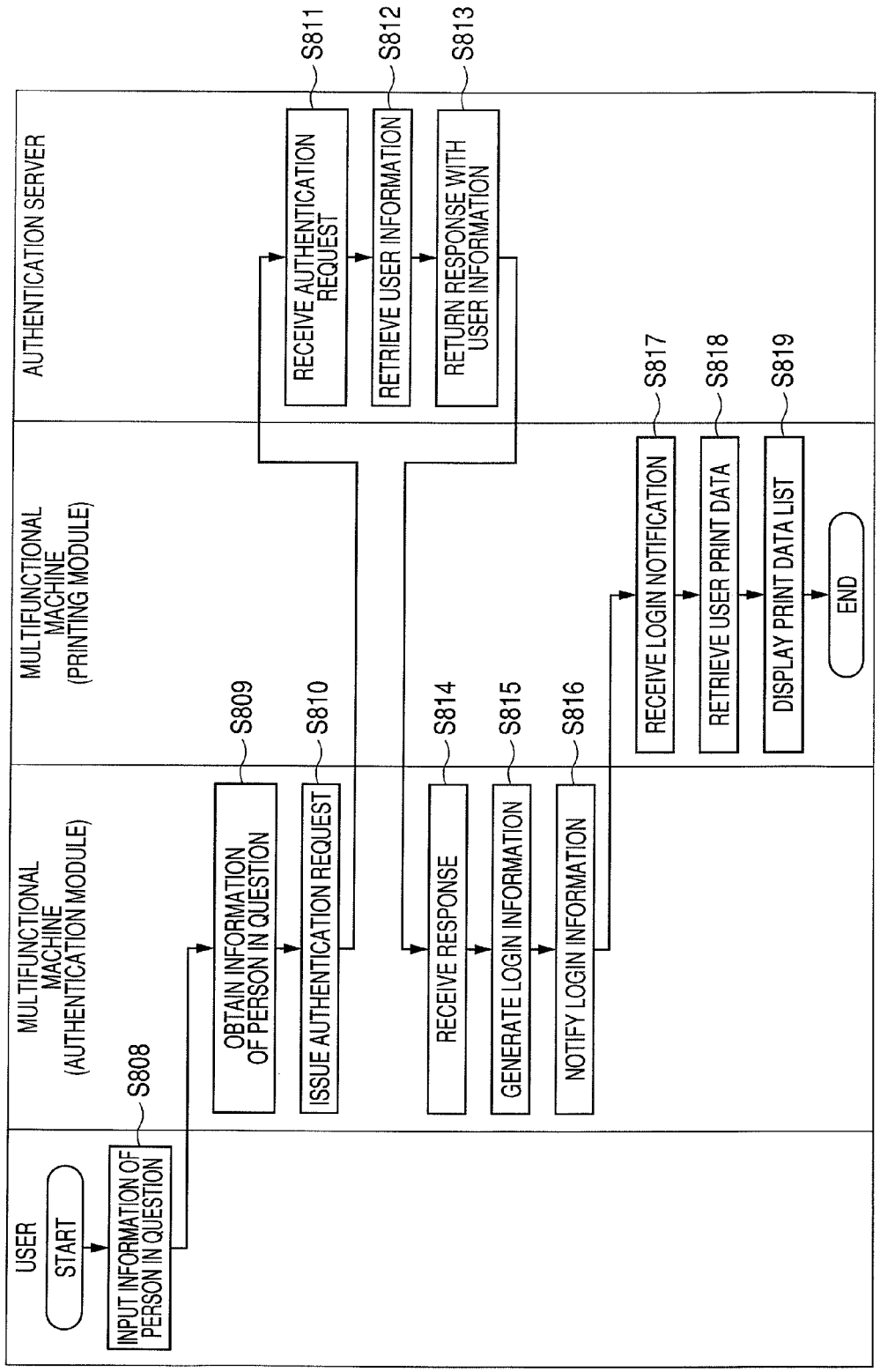
FIG. 12 is a flow chart illustrating an example of a list displaying process (or a list screen displaying process).

FIG. 12 is a flow chart illustrating an example of a list displaying (list screen displaying) process.

In a step S808, a user applies the IC card to the card reader 300 so that the card reader 300 reads the card ID (that is, user discrimination information for discriminating the user) from the applied IC card. In practice, the card reading module 310' (that is, the card information reading section 311') of the card reader detects that the IC card was applied by the user, and reads the card information from the applied IC card. Further, the card reading module 310' obtains the card ID from the read card information, and transmits the read card ID to the authentication module 420.

Incidentally, in the present embodiment, the multifunctional machine 400 performs the authentication by communicating with the authentication server 200. However, it is also possible to store in the HDD 304 of the multifunctional machine 400 a user information table on which the list of the user information for the authentication has been stored, and perform the authentication process by checking the user information table and the card ID. Further, in the present embodiment, the authentication is performed by using the IC card. However, it is also possible for the user to input a user ID (user name) and/or a password (that is, user discrimination information for discriminating the user) from the screen displayed on the operation unit 308, and to perform the authentication process by checking the user information table, the user ID (user name) and the password.

In a step S809, the authentication server communicating section 422 obtains the card ID transmitted from the card information reading section 311' in the card reading module 310', and then generates the authentication request packet. In the authentication request packet, an authentication request flag "0" indicating a user authentication request is set at the head as an object of the packet, and the card ID is set as the data subsequent to the authentication request flag.

In a step S810, the authentication server communicating section 422 transmits the authentication request packet generated in the step S809 to the authentication service 220 of the authentication server 200.

In a step S811, the user information responding section 222 in the authentication service 220 receives the authentication request transmitted from the authentication server communicating section 422 in the authentication module 420 of the multifunctional machine 400. Further, if the authentication request packet is normally received, the user information responding section 222 obtains the head of the packet. Then, if the obtained head indicates "0", the user information responding section 222 recognizes that the received packet is the authentication request, and thus obtains the card ID from the authentication request packet.

In a step S812, the user information responding section 222 retrieves the corresponding user information from the user information of FIGS. 3A and 3B held by the user information holding section 221 in response to the obtained card ID, and thus obtains the user information of the corresponding user.

In a step S813, the user information responding section 222 returns a response packet to the authentication request received in the step S811. Incidentally, if the corresponding user information exists as the result of the retrieval in the step S812, the user information responding section 222 generates the response packet in which a flag "0" indicating a success of the authentication is set at the head and the user information 501 to 508 of the corresponding user are set subsequent to the flag. On the other hand, if the corresponding user information does not exist as the result of the retrieval in the step S812, the user information responding section 222 generates the response packet in which only a flag "500" indicating a failure of the authentication is set at the head. Then, the user information responding section 222 returns the generated response packet to the authentication server communicating section 422 in the authentication module 420.

In a step S814, the authentication server communicating section 422 receives the response packet, and thus judges based on the response flag in the received response packet whether or not the authentication succeeded.

More specifically, if the response flag is "500" indicating the failure of the authentication, the authentication server communicating section 422 displays to the user an error message which indicates the failure of the authentication.

On the other hand, if the response flag is "0" indicating the success of the authentication, the authentication server communicating section 422 obtains from the response packet the user information 501 to 508 illustrated in FIGS. 3A and 3B, and transfers the notification indicating the success of the authentication and the obtained user information 501 to 508 to the authentication processing section 423.

In a step S815, the authentication processing section 423, which received the notification indicating the success of the authentication from the authentication server communicating section 422, generates login information including the user information 501 to 508 of FIGS. 3A and 3B obtained in the step S814.

In a step S816, the authentication processing section 423 notifies the printing section 414 in the printing module 410 of the login information generated in the step S815.

In a step S817, the printing section 414 in the printing module 410 receives the login information from the authentication processing section 423 in the authentication module 420. Then, the printing section 414 obtains the user information 501 to 508 of FIGS. 3A and 3B included in the received login information, and holds the obtained information on the memory (obtaining of printing authority information).

In a step S818, the printing section 414 obtains the user name 502 from the login information, obtains only the corresponding document information from the document information held on the RAM 302 by the print data managing section 413, and holds the obtained document information on the RAM 302 (obtaining of bibliographic information).

Figure 13:
FIG. 13 is a diagram illustrating an example of a list screen.

In a step S819, the printing section 414 generates a list screen as illustrated in FIG. 13 by using the document information of the user obtained in the step S818, and displays the generated list screen on the operation unit 308. FIG. 13 is the diagram illustrating an example of the list screen. Incidentally, the printing section 414 compares the information 506 to 508 (printing authority information) concerning the printing limitation in the user information obtained in the step S817 with the printing setting information in the bibliographic information of FIG. 2 obtained in the step S807. Then, the printing section 414 displays in gray, as the printing limitation documents, the list of the documents to which the printing setting limited based on the printing authority in the user information has been set. More specifically, the printing section 414 compares the color printing limitation information 506 in FIG. 3B with the color information 1606 in FIG. 2, compares the single-sided printing limitation information 507 in FIG. 3B with the double-sided printing information 1607 in FIG. 2, and compares the Nup printing limitation information 508 in FIG. 3B with the Nup information 1608 in FIG. 2. Then, if the printing setting of the printing setting information of the bibliographic information is not permitted by the printing limitation information of the user information, the printing section 414 (displaying function) determines (or judges) the document as a limitation document. Further, the printing section 414 (displaying function) adds a flag indicating the limitation document to the document information of the document which has been determined (or judged) as the limitation document.

Figure 14:
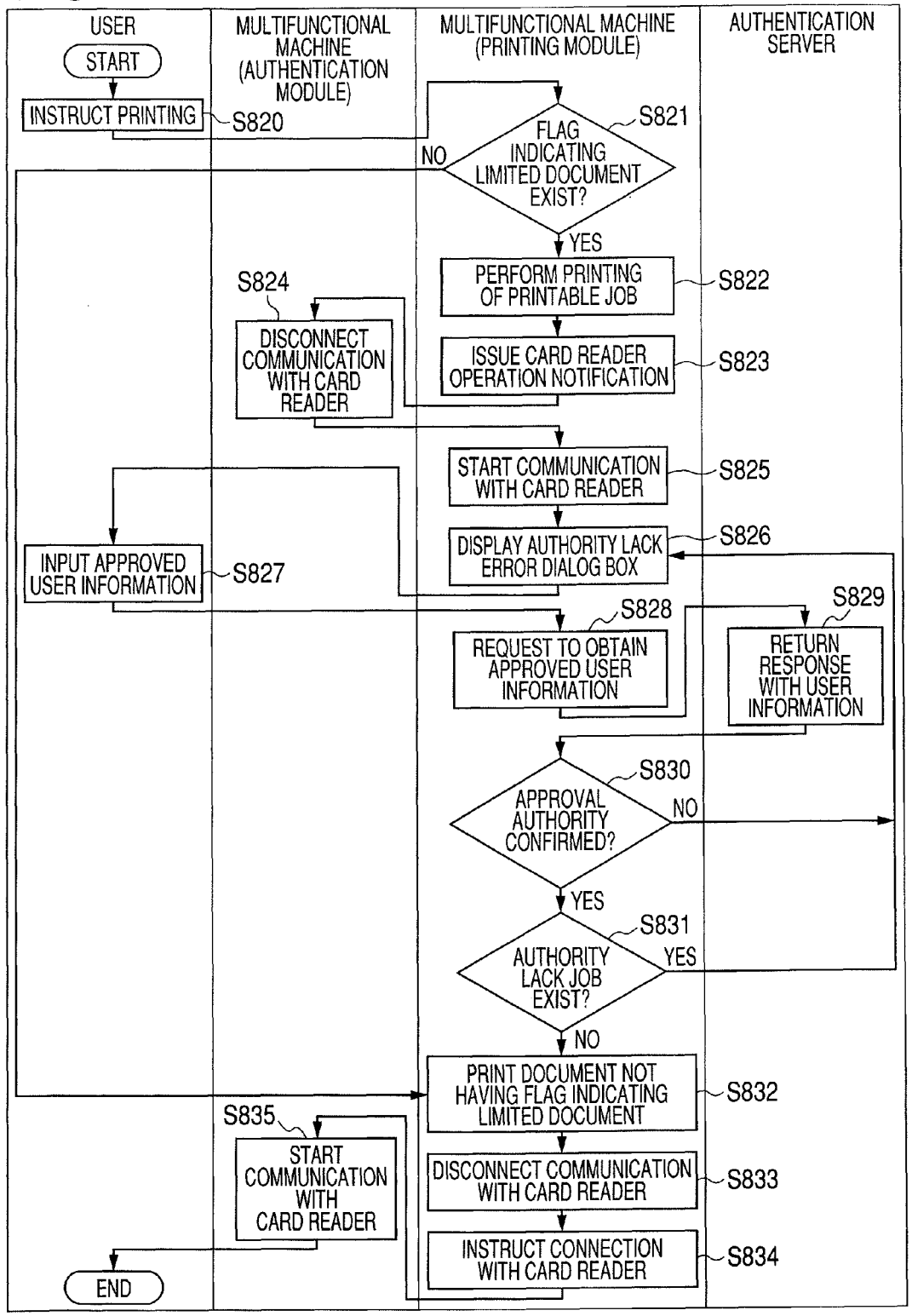
FIG. 14 is a flow chart illustrating an example of an approval printing process.

FIG. 14 is a flow chart illustrating an example of an approval printing process.

In a step S820, the printing section 414 accepts a printing instruction for the document selected via the list screen as illustrated in FIG. 13.

In a step S821, it is judged by the printing section 414 whether or not a flag indicating the limitation document set in the step S819 is included in the document information of the documents selected by the user (i.e., the user who logged in) and included in the printing instruction. Then, if all the documents selected are printable, the printing section 414 advances the process to a step S832 to start printing of all the documents. On the other hand, if as much as one limitation document is included in the documents selected, the printing section 414 advances the process to a step S822.

In the step S822, the printing section 414 performs the process concerning printing of the documents, from among the documents selected by the user who logged in, to which the flag indicating the limitation document is not set, that is, printing of printable documents (printing control).

In a step S823, the card reader controlling section 411 starts controlling of the card reader 300 for inputting the user information of the approved user. More specifically, as illustrated in FIG. 9, the card reader controlling section 411 issues, to the card reader controlling section 421 of the authentication module 420, a card reader disconnection request as an instruction for disconnecting the communication with the card reader 300.

In a step S824, the card reader controlling section 421 of the authentication module 420, which received a card reader operation notification from the card reader controlling section 411 of the printing module 410, disconnects the communication with the card reader 300 which is being connected. Further, if the communication with the card reader 300 normally ends, the card reader controlling section 421 of the authentication module 420 issues a card reader disconnection end notification to the card reader controlling section 411 of the printing module 410.

In a step S825, the card reader controlling section 411 of the printing module 410, which received the card reader disconnection end notification from the card reader controlling section 421 of the authentication module 420, newly starts communication with the card reader 300.

If the communication with the card reader 300 succeeded, in a step S826, the printing section 414 displays the authority lack dialog box as illustrated in FIG. 7 on the operation unit 308 so as to urge the approved user other than the user who logged in to input the user information (request of inputting of user information).

In a case where the authority lack dialog box is displayed by the printing section 414 of the printing module 410 and it is desired to continue the printing, in a step S827, the IC card of the approved user is applied to the card reader 300 to input the card information of the approved user. Incidentally, for example, if there is no IC card, it is also possible to make a system that the user inputs his/her name and password.

In a step S828, the card reader controlling section 411 obtains the card ID from the card information, and gives the obtained card ID to the authentication server communicating section 412. Then, the authentication server communicating section 412, which received the card ID, generates a user authentication request packet and issues an authentication request to the user information responding section 222 of the authentication service 220. Incidentally, it is judged by the authentication server communicating section 412 whether or not the received card ID is the same as the previous card ID. Then, if it is judged that the received card ID is the same as the previous card ID, any packet transmission to the authentication server 200 is not performed, and instead an error message indicating that there is no authority because of the same card is displayed on the operation unit 308.

In a step S829, the user information responding section 222, which received the authentication request packet, obtains the user ID from the received authentication request packet (obtaining of user information). Then, the user information responding section 222 retrieves the user information of the corresponding user in the list of the user information of FIG. 3 which is extracted on the memory by the user information holding section 221. As the result of the retrieval, if the corresponding user information exists, the user information responding section 222 responds to the authentication server communicating section 412 of the printing module 410, with the user information 501 to 508 of the corresponding user. That is, the printing section 414 of the printing module 410 obtains the user information 501 to 508 of the approved user (obtaining of approved user printing authority information). On the other hand, if the corresponding user information does not exist, the user information responding section 222 issues a response indicating a failure of the authentication.

In a step S830, the printing section 414 of the printing module 410, which obtained the user information from the authentication server 200, confirms the approval authority of the user. More specifically, the printing section 414 confirms based on the approval authority 504 of the user information whether or not the approved user has the approval authority. In other words, if the approval authority 504 is "1", the printing section 414 judges that the approval is possible. On the other hand, if the approval authority 504 is "0", the printing section 414 judges that the approval is impossible.

If the approved user does not have the approval authority, the printing section 414 advances the process to the step S826 to display on the operation unit 308 the approval authority lack error dialog box as illustrated in FIG. 8. On the other hand, if the approved user has the approval authority, the printing section 414 compares the hierarchical group identifier 503 of the user who performs the printing with the hierarchical group identifier 503 of the user who is approved. Then, if a difference between these hierarchies is within the approval authority effective layer indicated by the approval authority effective layer 505, the printing section 414 judges that the approved user has the effective approval authority, and advances the process to a step S831. On the other hand, if the difference between these hierarchies is not within the approval authority effective layer indicated by the approval authority effective layer 505, the printing section 414 judges that the approved user does not have the effective approval authority, and advances the process to the step S826 to display on the operation unit 308 the approval authority lack error dialog box as illustrated in FIG. 8 (authority lack notification).

Incidentally, if the approval authority lacks, as illustrated in FIG. 8, it is urged on the display unit to input the user information of another user. However, it may be urged to input the user information of another user by means of voices.

Figure 15:
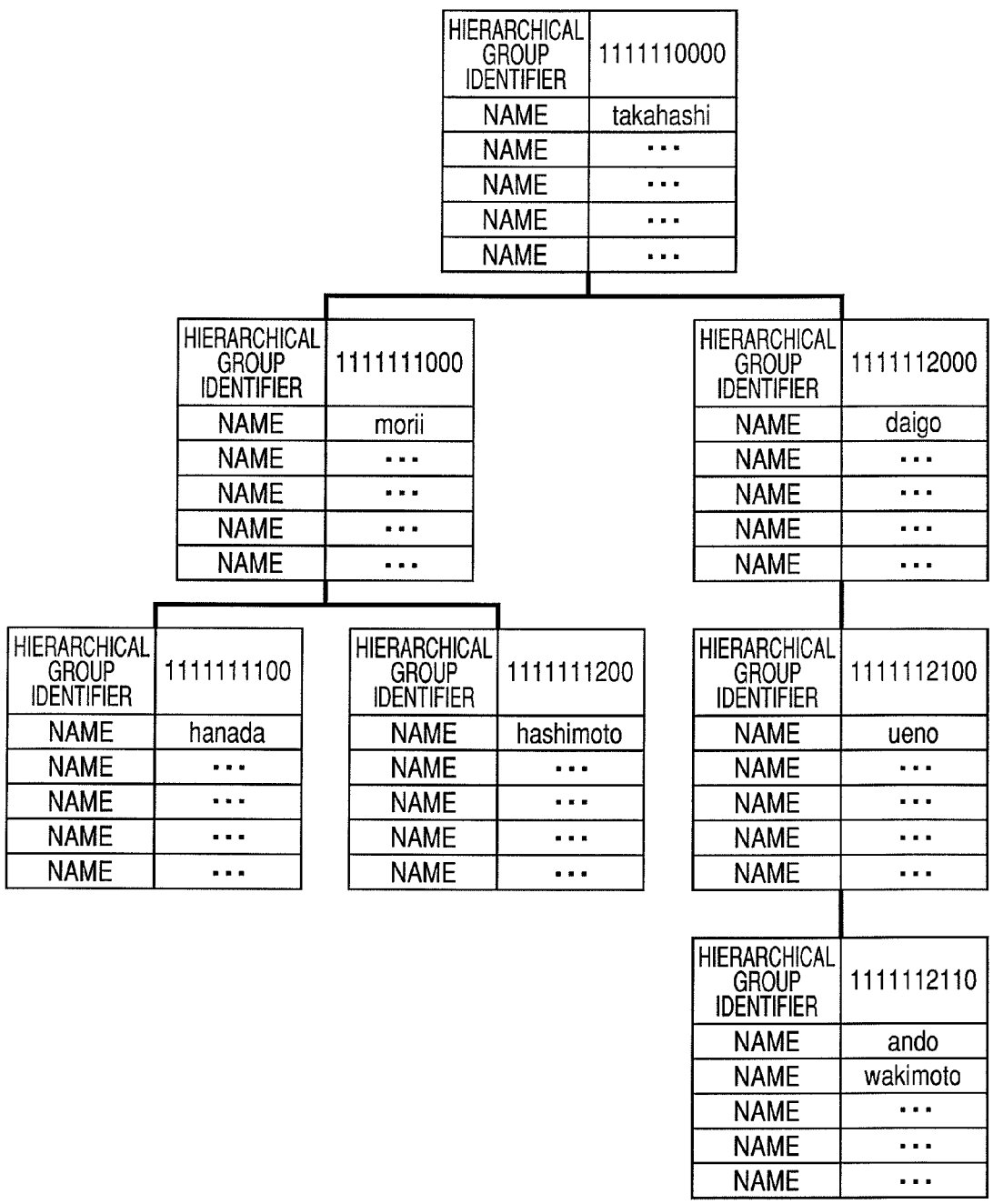
FIG. 15 is a diagram illustrating an example of a hierarchy.

Hereinafter, a hierarchy judging process which is performed by the printing section 414 will be described concretely. Incidentally, FIG. 15 is a diagram illustrating an example of a hierarchy.

(1) Judgment (comparison) of hierarchies of person in question and approved user The number of digits (or places) from the last single digit of the hierarchical group identifier of the person in question to a digit that numeral other than "0" first appears is obtained (the number of digits of the person in question).

The number of digits from the last single digit of the hierarchical group identifier of the approved user to a digit that numeral other than "0" first appears is obtained (the number of digits of the approved user).

If the number of digits of the person in question is larger than the number of digits of the approved user, approval is impossible because the hierarchy of the person (user) in question is higher than that of the approved user.

Example that Approval is Impossible

The hierarchical group identifier of the person in question: 1111100000

The hierarchical group identifier of the approved user: 1111110000

In this case, the number of digits of the person in question is "6" and the number of digits of the approved user is "5". Therefore, approval is impossible because the person in question is in the higher hierarchy.

Example that Approval is Possible

The hierarchical group identifier of the person in question: 1111110000

The hierarchical group identifier of the approved user: 1111100000

In this case, the number of digits of the person in question is "5" and the number of digits of the approved user is "6". Therefore, approval is possible because the approved user is in the higher hierarchy.

(2) Judgment as to whether hierarchical group identifier of person in question is within approval authority effective range of approved user The minimum numeral of the number of digits of the approval range is obtained from the number of digits of the approval user obtained in (1) and the number of digits of the approval authority effective range of the approved user (approval range identifier).

The hierarchical group identifier of the person (user) in question is divided by the minimum numeral of the number of digits of the approved user, and approval is impossible if the remainder is given.

Example that Approval is Impossible

The hierarchical group identifier of the person in question: 1111111010

The approval authority effective hierarchy: 2

The number of digits of the approved user: 5 (the hierarchical group identifier of the approved user: 1111110000)

In this case, since the approval authority effective hierarchy is "2" and the number of digits of the approved user is "5", the approval range identifier is the minimum value "100" of three digits.

The hierarchical group identifier of the person in question÷the approval range identifier=1111111010÷ 100= 11111110 . . . the remainder 10

Since the remainder is given, approval is impossible because the hierarchical group identifier of the person in question is outside the approval authority effective range.

Example that Approval is Possible

The hierarchical group identifier of the person in question: 1111111200

The approval authority effective hierarchy: 2

The number of digits of the approved user: 5 (the hierarchical group identifier of the approved user: 1111110000)

In this case, since the approval authority effective hierarchy is "2" and the number of digits of the approved user is "5", the approval range identifier is the minimum value "100" of three digits.

The hierarchical group identifier of the person in question÷the approval range identifier= 1111111200÷ 100= 11111120 . . . no remainder Since no remainder is given, approval is possible because the hierarchical group identifier of the person in question is within the approval authority effective range.

In the step S831, the printing section 414 confirms the printing authority of the approved user in regard to the printing document for which the printing authority of the person (user) in question was judged in the step S821 to lack. That is, the printing section 414 judges whether or not the documents list-displayed in, e.g., the authority lack dialog box illustrated in FIG. 7 can be printed by the printing authority of the approved user. Here, it should be noted that the printing section 414 performs the judging of the printing authority in the same manner as the judging in the step S819. Then, if the document can be printed by the printing authority of the approved user, the printing section 414 deletes the flag set in the step S819 and indicating the limitation document. In this process, if all the flags indicating the respective limitation documents are deleted, the printing section 414 advances the process to the step S832. On the other hand, if the document to which the flag indicating the limitation document has been set still exists in the target documents, the printing section 414 prints only the printable documents (that is, the documents of which the flags were deleted). Then, the printing section 414 advances the process to the step S826.

In the step S832, the printing section 414 prints the document to which the flag indicating the limitation document is not set (printing control).

In a step S833, if all the documents are printed, the card reader controlling section 411 of the printing module 410 ends the communication with the card reader 300 so as to end the card reader controlling.

In a step S834, if the communication with the card reader 300 is disconnected, the card reader controlling section 411 issues a card reader connection instruction to the card reader controlling section 421 of the authentication module 420.

In a step S835, the card reader controlling section 421 of the authentication module 420, which received the card reader connection instruction from the card reader controlling section 411 of the printing module 410, starts the communication with the card reader 300.

In the present embodiment, in case of generating the list screen in the step S819, the color printing limitation information 506 in FIG. 3B is compared with the color information 1606 in FIG. 2, the single-sided printing limitation information 507 in FIG. 3B is compared with the double-sided printing information 1607 in FIG. 2, and the Nup printing limitation information 508 in FIG. 3B is compared with the Nup information 1608 in FIG. 2. Then, if the printing setting of the printing setting information of the bibliographic information is not permitted by the printing limitation information of the user information, the printing section 414 (displaying function) determines (or judges) the document as the limitation document. However, it is also possible not to judge, in case of generating the list screen, whether or not the document is the limitation document.

In this case, the limitation document may not discriminably displayed in gray or the like on the list screen. Further, when the printing instruction is received in the step S820, the flag indicating the limitation document may not be set in the step S821. Instead, the information 506 to 508 (print authority information) concerning the printing limitation in the user information obtained in the step S817 for each document designated on the list screen may be compared with the printing setting information in the bibliographic information of FIG. 2 obtained in the step S807.

Second Embodiment

In the first embodiment, the print data is stored in the HDD 304 of the multifunctional machine 400. However, the present invention is not limited to this. That is, the print data may be held in a print server so that the held print data is printed according to an instruction from the multifunctional machine 400.

In the second embodiment, such a process as mentioned above will be described.

Figure 16:
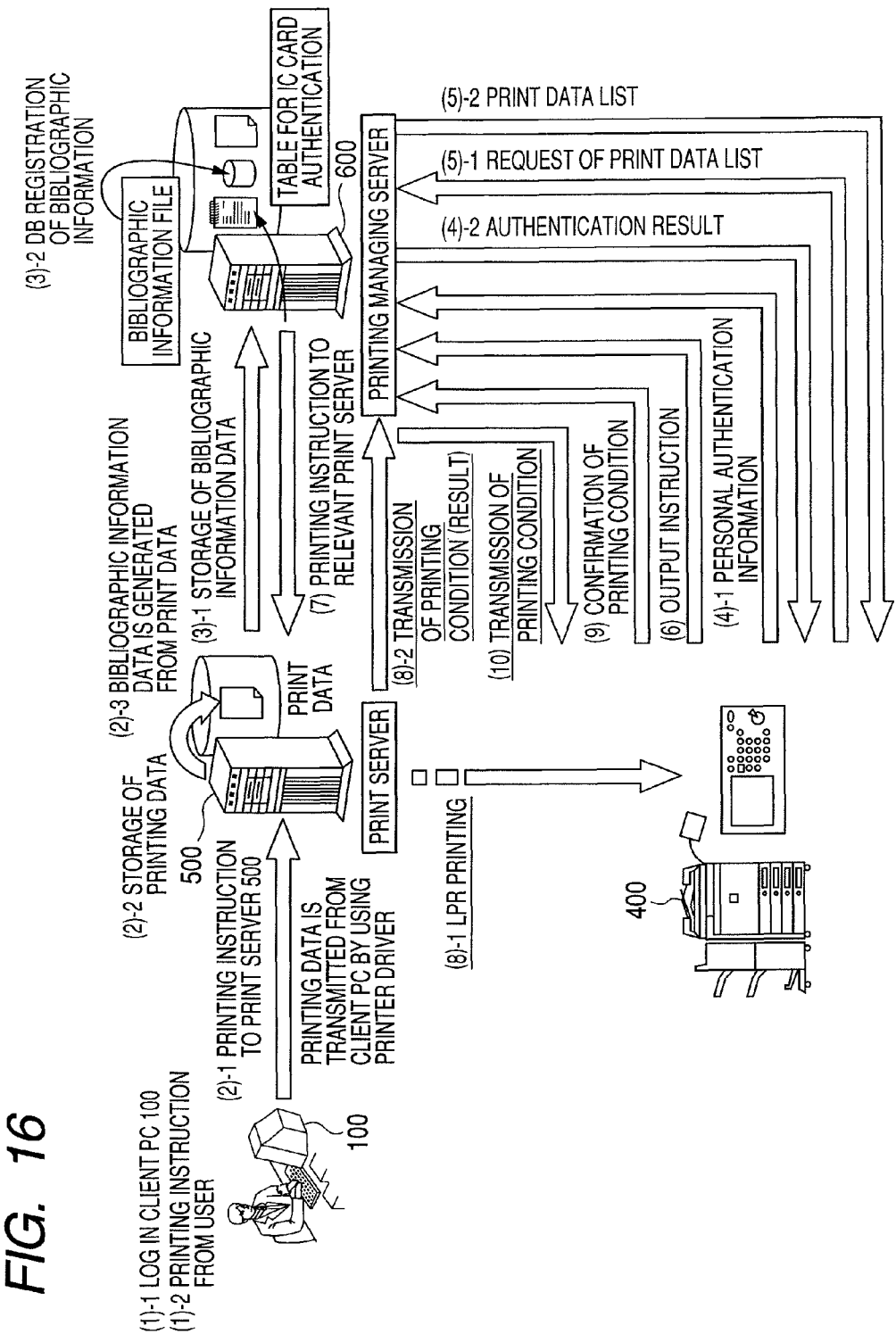
FIG. 16 is a diagram illustrating an example of the system configuration of a printing system and an example of a process of the printing system, according to the second embodiment.

FIG. 16 is a diagram illustrating an example of the system configuration of a printing system and an example of a process of the printing system, according to the second embodiment. As illustrated in FIG. 16, a user first logs in the client PC 100 ((1)-1), and issues a printing instruction from an application program performed by the client PC 100 to a logical printer corresponding to the printer driver set as the printing destination ((1)-2).

In response to the printing instruction, the application program of the client PC 100 transfers the data to the printer driver via a graphic engine. The printer driver of the client PC 100 generates the print data based on the data received from the application program via the graphic engine. Then, the client PC 100 transmits the generated print data to a print server 500 ((2)-1). Then, the print server 500 stores the print data to the predetermined storage position in the storage unit (RAM or HDD) ((2)-2). Here, the print data is transmitted from the client PC 100 to the print server 500 by, for example, a scheme of LPR (Line Printer daemon protocol) printing. Moreover, it should be noted that the print server 500, which stores the print data to the predetermined storage position, does not transit the print data to a printing apparatus.

Next, the print server 500 extracts (generates) the bibliographic information from the print data received from the client PC 100 and stored at the predetermined storage position ((2)-3), and transmits the extracted (generated) bibliographic information to a printing managing server 600. Then, the printing managing server 600 stores the received bibliographic information at the predetermined storage position (predetermined directory) of the printing managing server 600 itself by using a file sharing scheme on the network ((3)-1).

The printing managing server 600 monitors the predetermined directory. Then, if a bibliographic information file transmitted from the print server 500 is stored at the predetermined directory, the printing managing server 600 analyzes the stored bibliographic information file, and registers the bibliographic information to a bibliographic information DB ((3)-2). Incidentally, it should be noted that the bibliographic information DB is provided on an external storage apparatus of the printing managing server 600.

Further, if the IC card which can be read by the card reader 300 is detected, the multifunctional machine 400 reads personal authentication information (user information) included in the IC card, and transmits the read personal authentication information to the printing managing server 600 as an authentication request ((4)-1). Here, it should be noted that the personal authentication information, which is the information to be used for the authentication, may be a production number (card ID) of the IC card. In any case, the above process corresponds to the steps S809 and S810 in FIG. 12.

The printing managing server 600, which received the personal authentication information from the multifunctional machine 400, performs an authentication process of the received personal authentication information based on an IC card authentication table (FIG. 3A in the first embodiment) of the printing managing server 600, and returns an authenticated result to the multifunctional machine 400 ((4)-2). Here, it is assumed that the IC card authentication table has been stored in an external storage apparatus of the printing managing server 600. Further, it is assumed that, if the authentication process is succeeded, the printing managing server 600 transmits as the authenticated result the user ID of the user who logged in the client PC 100 and the authentication information (501 to 508 in FIG. 3A). The above process corresponds to the steps S811 and S813 in FIG. 12 in the first embodiment.

Subsequently, the multifunctional machine 400, which received from the printing managing server 600 the authenticated result indicating the success of the authentication (that is, the user ID of the user who logged in the client PC 100), transmits a print data list request to the printing managing server 600 ((5)-1). Incidentally, it is assumed that the print data list request includes the user ID of the user who logged in the client PC 100 (that is, the name of the user who logged in the client PC 100).

The printing managing server 600, which received the print data list request from the multifunctional machine 400, retrieves the bibliographic information DB based on the user ID included in the print data list request, generates a print data list corresponding to the user ID, and returns the generated print data list to the multifunctional machine 400 ((5)-2). Here, it is assumed that each data constituting the print data list includes the setting information such as the printing setting and the like to be used in case of the printing.

The multifunctional machine 400, which received the print data list from the printing managing server 600, displays the print data list on the UI of the operation unit 308 (FIG. 13 in the first embodiment). Then, if the print data is selected and a printing instruction is issued by the user, the multifunctional machine 400 checks the printing authority of the selected print data. Here, it should be noted that the printing authority is checked based on the authority held by the user and the printing setting associated with each data (job) when the print data list is obtained. If the print data can be printed as the result of this check, the multifunctional machine 400 transmits a printing request (output instruction) to the printing managing server 600 (6). Incidentally, it is assumed that the printing request includes the name of the user who logged in the client PC 100, a time stamp of the print data, and the like.

Further, if the print data cannot be printed as the result of the authority check, the multifunctional machine 400 performs the displaying as illustrated in FIGS. 7 and 8 so as to urge the authentication of another user (authenticated user). Here, since the controlling at this time is equivalent to the controlling of the steps S821 to S835 illustrated in FIG. 14, the detailed description thereof will be omitted.

The printing managing server 600, which received the printing request (output instruction) of the print data from the multifunctional machine 400, retrieves, from the bibliographic information DB, the bibliographic information of the print data to which the output instruction was issued, by using the name of the user who logged in the client PC 100 and the time stamp of the print data as keys. Then, the printing managing server 600 specifies the print server 500, which stores therein the corresponding print data, from the retrieved bibliographic information, and transmits the printing instruction of the corresponding print data to the specified print server 500 (7). Incidentally, it should be noted that the printing instruction is a printing command which includes a file name of the corresponding print data. Further, it should be noted that the above-described time stamp is given when the print data is received by the print server 500.

The print server 500, which received the printing instruction from the printing managing server 600, transmits the print data to the multifunctional machine 400 in response to the printing instruction to cause the multifunctional machine 400 to print the print data (LPR printing) ((8)-1).

Further, after the LPR printing ((8)-1), the print server 500 transmits a printing condition (result) to the printing managing server 600 ((8)-2). The printing managing server 600, which received the printing condition (result), stores and holds the received printing condition (result) in an external memory or an RAM.

Furthermore, after the output instruction to the printing managing server 600 (6), the multifunctional machine 400 issues a printing condition confirmation request to the printing managing server 600 (9). Here, it should be noted that the printing condition confirmation request is issued from the multifunctional machine 400 to the printing managing server 600 every predetermined time.

In response to the printing condition confirmation request (9), the printing managing server 600 transmits the printing condition (result) stored and held in the external memory or the RAM to the multifunctional machine 400 (10).

Incidentally, the multifunctional machine 400 stores the received printing condition (result) in the HDD 304 or the RAM 302, and then displays the stored condition on the operation unit 308.

As described above, according to the embodiments, if the user who does not have the authority for performing printing based on the printing setting of the document intends to print the relevant document, he/she can easily print the relevant document according to the approval of the approved user.

Incidentally, in the embodiments, the print server 500 and the printing managing server 600 are provided independently. However, the print server 500 and the printing managing server 600 may be provided in an identical chassis.

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-281815, filed Oct. 30, 2007, which is hereby incorporated by reference herein in its entirety.

What is claimed is:

1. An image forming apparatus which can communicate with a user management apparatus configured to store user discrimination information for discriminating a user and printing authority information corresponding to the user discrimination information, by which print data specified by the user discrimination information is printable, and which has a reading unit configured to read, from a storage medium, information stored in the storage medium, the image forming apparatus comprising:
   a printing authority information obtaining unit configured to obtain, from the user management apparatus, the printing authority information corresponding to the user discrimination information for discriminating the user specified according to reading by the reading unit, in accordance with application of the storage medium by the user;
   a first judging unit configured to judge, based on the printing authority information corresponding to first user discrimination information for discriminating a first user obtained by the printing authority information obtaining unit, whether or not print data specified by the first user discrimination information is printable;
   a determining unit configured to determine, in a case where it is judged by the first judging unit that the print data specified by the first user discrimination information is unprintable based on the printing authority information corresponding to the first user discrimination information, the print data being printable based on the printing authority information corresponding to second user discrimination information for discriminating a second user obtained by the printing authority information obtaining unit, for the print data judged to be unprintable based on the printing authority information corresponding to the first user discrimination information; and
   a printing unit configured to print the printable print data determined by the determining unit.

2. An image forming apparatus according to claim 1, further comprising:
   a print data list obtaining unit configured to obtain a list of the print data specified by the first user discrimination information; and
   a list displaying unit configured to display the list of the print data obtained by the print data list obtaining unit so as to be able to discriminate whether the print data is the print data printable based on the printing authority information corresponding to the first user discrimination information or the print data unprintable based on the printing authority information corresponding to the first user discrimination information.

3. An image forming apparatus according to claim 2, further comprising:
   a print data instruction unit configured to instruct the print data to be printed, from the list of the print data displayed by the list displaying unit; and
   an input notifying unit configured to issue, in a case where it is judged by the first judging unit that the print data instructed by the print data instruction unit is unprintable based on the printing authority information corresponding to the first user discrimination information, a notification by display or voice to urge data input from the second user.

4. An image forming apparatus according to claim 2, wherein
   the printing authority information corresponding to the first user discrimination information includes printing setting information which is printable by the first user, the list of the print data includes printing setting information for each of the print data, and
   the first judging unit compares the printing setting information for each of the print data with the printing setting information included in the printing authority information corresponding to the first user discrimination information.

5. An image forming apparatus according to claim 1, wherein
   in a case where the storage medium of the second user is read by the reading unit, the printing authority information obtaining unit obtains the printing authority information corresponding to the second user discrimination information for discriminating the second user from the user management apparatus, and
   the determining unit includes a second judging unit configured to judge whether or not the print data specified by the first user discrimination information is printable, based on the printing authority information corresponding to the second user discrimination information.

6. An image forming apparatus according to claim 5, further comprising an authority lack notifying unit configured to issue, in a case where it is judged by the second judging unit that the print data specified by the first user discrimination information is unprintable, a notification indicating that authority of the second user lacks.

7. An image forming apparatus according to claim 5, wherein
   the printing authority information corresponding to the second user discrimination information includes permission authority information which defines whether or not to permit printing of the print data of the first user, and
   the second judging unit judges whether or not the input print data specified by the first user discrimination information is printable according to the permission authority information included in the printing authority information corresponding to the second user discrimination information.

8. An image forming apparatus according to claim 1, wherein the user management apparatus is provided on a chassis different from the image forming apparatus.

9. A printing system which includes a user management apparatus configured to store user discrimination information for discriminating a user and printing authority information corresponding to the user discrimination information, an image forming apparatus having a reading unit configured to read, from a storage medium, information stored in the storage medium, and a print server, wherein:
   the print server comprises
      a print data receiving unit configured to receive print data from an information processing apparatus being communicable through a network, and
      a print data storing unit configured to store the print data received by the print data receiving unit, together with the user discrimination information of a user who intends printing; and
   the image forming apparatus comprises
      a printing authority information obtaining unit configured to obtain, from the user management apparatus, the printing authority information corresponding to the user discrimination information for discriminating the user specified according to reading by the reading unit, in accordance with application of the storage medium by the user,
      a first judging unit configured to judge, based on the printing authority information corresponding to first user discrimination information for discriminating a first user obtained by the printing authority information obtaining unit, whether or not the print data specified by the first user discrimination information is printable, and a printing unit configured to print, in a case where it is judged by the first judging unit that the print data specified by the first user discrimination information is unprintable based on the printing authority information corresponding to the first user discrimination information, the print data judged to be unprintable based on the printing authority information corresponding to the first user discrimination information, based on the printing authority information corresponding to second user discrimination information for discriminating a second user obtained by the printing authority information obtaining unit.

10. A printing method in an image forming apparatus which can communicate with a user management apparatus configured to store user discrimination information for discriminating a user and printing authority information corresponding to the user discrimination information, by which print data specified by the user discrimination information is printable, and which has a reading unit configured to read, from a storage medium, information stored in the storage medium, the printing method comprising:

obtaining, from the user management apparatus, the printing authority information corresponding to the user discrimination information for discriminating the user specified according to reading by the reading unit, in accordance with application of the storage medium by the user;

judging, based on the printing authority information corresponding to first user discrimination information for discriminating a first user obtained in the printing authority information obtaining step, whether or not print data specified by the first user discrimination information is printable;

determining, in a case where it is judged that the print data specified by the first user discrimination information is unprintable based on the printing authority information corresponding to the first user discrimination information, the print data being printable based on the printing authority information corresponding to second user discrimination information for discriminating a second user obtained, for the print data judged to be unprintable based on the printing authority information corresponding to the first user discrimination information; and printing the determined printable print data.

11. A printing method in a printing system which includes a user management apparatus configured to store user discrimination information for discriminating a user and printing authority information corresponding to the user discrimination information, an image forming apparatus having a reading unit configured to read, from a storage medium, information stored in the storage medium, and a print server, wherein:

the print server is controlled to perform steps comprising
a print data receiving step of receiving print data from an information processing apparatus being communicable through a network, and
a storing step of storing the received print data, together with the user discrimination information of a user who intends printing; and the image forming apparatus is controlled to perform steps comprising
an obtaining step of obtaining, from the user management apparatus, the printing authority information corresponding to the user discrimination information for discriminating the user specified according to reading by the reading unit, in accordance with application of the storage medium by the user,
a judging step of judging, based on the printing authority information corresponding to first user discrimination information for discriminating a first user obtained, whether or not the print data specified by the first user discrimination information is printable, and
a printing step of printing, in a case where it is judged that the print data specified by the first user discrimination information is unprintable based on the printing authority information corresponding to the first user discrimination information, the print data judged to be unprintable based on the printing authority information corresponding to the first user discrimination information, based on the printing authority information corresponding to second user discrimination information for discriminating a second user obtained.

12. A non-transitory computer-readable medium which stores a computer-executable program which is executed in an image forming apparatus which can communicate with a user management apparatus configured to store user discrimination information for discriminating a user and printing authority information corresponding to the user discrimination information, by which print data specified by the user discrimination information is printable, and which has a reading unit configured to read, from a storage medium, information stored in the storage medium, the computer-executable program comprising:

a code to obtain, from the user management apparatus, the printing authority information corresponding to the user discrimination information for discriminating the user specified according to reading by the reading unit, in accordance with application of the storage medium by the user;

a code to judge, based on the printing authority information corresponding to first user discrimination information for discriminating a first user obtained by the printing authority information obtaining code, whether or not print data specified by the first user discrimination information is printable;

a code to determine, in a case where it is judged that the print data specified by the first user discrimination information is unprintable based on the printing authority information corresponding to the first user discrimination information, the print data being printable based on the printing authority information corresponding to second user discrimination information for discriminating a second user obtained by the printing authority information obtaining code, for the print data judged to be unprintable based on the printing authority information corresponding to the first user discrimination information; and a code to print the determined printable print data.

13. A computer-executable program according to claim 12, wherein the program causes the image forming apparatus to further function as:

a print data list obtaining unit configured to obtain a list of the print data specified by the first user discrimination information; and a list displaying unit configured to display the list of the print data obtained by the print data list obtaining unit so as to be able to discriminate whether the print data is the print data printable based on the printing authority information corresponding to the first user discrimination information or the print data unprintable based on the printing authority information corresponding to the first user discrimination information.

14. A computer-executable program according to claim 13, wherein the program causes the image forming apparatus to further function as:
   a print data instruction unit configured to instruct the print data to be printed, from the list of the print data displayed by the list displaying unit; and
   an input notifying unit configured to issue, in a case where it is judged by the first judging unit that the print data instructed by the print data instruction unit is unprintable based on the printing authority information corresponding to the first user discrimination information, a notification by display or voice to urge data input from the second user.

15. A computer-executable program according to claim 13, wherein
   the printing authority information corresponding to the first user discrimination information includes printing setting information which is printable by the first user,
   the list of the print data includes the printing setting information for each of the print data, and
   the first judging unit compares the printing setting information for each of the print data with the printing setting information included in the printing authority information corresponding to the first user discrimination information.

16. A computer-executable program according to claim 12, wherein
   in a case where the storage medium of the second user is read by the reading unit, the printing authority information obtaining unit obtains the printing authority information corresponding to the second user discrimination information for discriminating the second user from the user management apparatus, and
   the determining unit judges whether or not the print data specified by the first user discrimination information is printable, based on the printing authority information corresponding to the second user discrimination information.

17. A computer-executable program according to claim 16, wherein the program causes the image forming apparatus to further function as an authority lack notifying unit configured to issue, in a case where it is judged that the print data specified by the first user discrimination information is unprintable, a notification indicating that authority of the second user lacks.

18. A computer-executable program according to claim 16, wherein
   the printing authority information corresponding to the second user discrimination information includes permission authority information which defines whether or not to permit printing of the print data of the first user, and
   the determining unit judges whether or not the input print data specified by the first user discrimination information is printable according to the permission authority information included in the printing authority information corresponding to the second user discrimination information.

19. A non-transitory computer readable recording medium which stores a computer-executable program which is executed in an image forming apparatus which can communicate with a user management apparatus configured to store user discrimination information for discriminating a user and printing authority information corresponding to the user discrimination information, by which print data specified by the user discrimination information is printable, and which has a reading unit configured to read, from a storage medium, information stored in the storage medium, the computer-executable program comprising:
   a code to obtain, from the user management apparatus, the printing authority information corresponding to the user discrimination information for discriminating the user specified according to reading by the reading unit, in accordance with application of the storage medium by the user;
   a code to judge, based on the printing authority information corresponding to first user discrimination information for discriminating a first user obtained by the printing authority information obtaining code, whether or not print data specified by the first user discrimination information is printable;
   a code to determine, in a case where it is judged that the print data specified by the first user discrimination information is unprintable based on the printing authority information corresponding to the first user discrimination information, the print data being printable based on the printing authority information corresponding to second user discrimination information for discriminating a second user obtained by the printing authority information obtaining code, for the print data judged to be unprintable based on the printing authority information corresponding to the first user discrimination information; and
   a code to print the determined printable print data.

\* \* \* \* \*